US010003967B2

(12) United States Patent
Palat et al.

(10) Patent No.: US 10,003,967 B2
(45) Date of Patent: Jun. 19, 2018

(54) BEARER RELEASE

(71) Applicant: Alcatel Lucent, Boulogne Billancourt (FR)

(72) Inventors: Sudeep Palat, Swindon (GB); Chandrika Worrall, Newbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days. days.

(21) Appl. No.: 15/300,228

(22) PCT Filed: Mar. 12, 2015

(86) PCT No.: PCT/EP2015/055175
§ 371 (c)(1),
(2) Date: Sep. 28, 2016

(87) PCT Pub. No.: WO2015/150044
PCT Pub. Date: Oct. 8, 2015

(65) Prior Publication Data
US 2017/0156059 A1 Jun. 1, 2017

(30) Foreign Application Priority Data
Mar. 31, 2014 (EP) .................................... 14305468

(51) Int. Cl.
*H04M 1/66* (2006.01)
*H04W 12/04* (2009.01)
(Continued)

(52) U.S. Cl.
CPC ......... *H04W 12/04* (2013.01); *H04W 76/028* (2013.01); *H04W 76/041* (2013.01)

(58) Field of Classification Search
USPC ........................................................ 455/411
See application file for complete search history.

(56) References Cited

U.S. PATENT DOCUMENTS 9,794,969 B2 * 10/2017 Li ........................ H04W 76/021
2015/0264741 A1 * 9/2015 Jheng .................. H04W 76/068
455/436

(Continued)

OTHER PUBLICATIONS

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.1.0, chapters 5.1.2, 5.3.1.1-5.3.1.3, 5.3.4, 5.3.5-5.3.10.9, 5.5, XP050769960, (Mar. 2014).

(Continued)

*Primary Examiner* — Timothy Pham
(74) *Attorney, Agent, or Firm* — Fay Sharpe, LLP

(57) ABSTRACT

A user equipment method, user equipment, a base station method, a base station and computer program products. The user equipment method, comprises: on reception of a trigger instructing modification of an access stratum radio bearer, preventing release of an associated non-access stratum bearer. In this way, when an access stratum or data radio bearer is instructed to be modified (as may occur when security credentials for that bearer need to be updated), the associated non-access stratum bearer may be retained in order to allow a update in security credentials to occur without disrupting communication or losing data.

13 Claims, 5 Drawing Sheets

Release and addition of the bearer without indication to NAS

(51) Int. Cl.
*H04W 76/04* (2009.01)
*H04W 76/02* (2009.01)

(56) References Cited

U.S. PATENT DOCUMENTS

2015/0351139 A1* 12/2015 Zhang ............... H04W 52/0251
370/329
2016/0021581 A1* 1/2016 Deenoo ............. H04W 36/0055
370/331

OTHER PUBLICATIONS

Alcatel-Lucent, "DRB release," 3$^{rd}$ Generation Partnership Project (3GPP), 3GPP TSG-RAN WG2 Meeting #65, R2-091233, 5 pages, XP050323323, Athens, Greece, Feb. 9-13, 2009.
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN; Overall description; Stage 2 (Release 12)," 3GPP TS 36.300, V12.1.0, chapters 3.1, 4.7, 6.2, 7.3, 8.2, 13, 14, 19.2.2.4, XP050769957, (Mar. 2014).
3$^{rd}$ Generation Partnership Project; Technical Specification Group Radio Access Network; Evolved Universal Terrestrial Radio Access Network (E-UTRAN); S1 Application Protocol (S1AP) (Release 12), 3GPP TS 36.413 V12.1.0, pp. 1-285, XP050769900, (Mar. 2014).
ZTE, "Signalling Flow description for 3C," 3$^{rd}$ Generation Partnership Project (3GPP), 3GPP TSG-RAN WG2 Meeting #82, R2-132205, pp. 1-5, XP050755079, San Francisco, CA, USA, Nov. 11-15, 2013.
Ericsson, "Signalling procedures for dual connectivity," 3$^{rd}$ Generation Partnership Project (3GPP), 3GPP TSG-RAN WG2 #84, R2-134219, pp. 1-9, XP050736966, San Francisco, USA, Nov. 11-15, 2013.
3$^{rd}$ Generation Partnership Project (3GPP), Technical Specification Group Radio Access Network; Study on Small Cell enhancements for E-UTRA and E-UTRAN; Higher layer aspects (Release 12), 3GPP TR 36.842, V12.0.0, pp. 1-71, XP050729403, (Dec. 2013).
International Search Report for PCT/EP2015/055175 dated May 22, 2015.

* cited by examiner

Radio Protocol Stack for a bearer

Radio Protocol Architecture for Dual Connectivity

Encryption block diagram showing use of COUNT and KEY as inputs

Existing behaviour when a radio bearer is released

Existing technique for dealing with COUNT wrap around in SeNB

Release and addition of the bearer without indication to NAS

Release and addition of a bearer for a wrap around
in SeNB without impacting anything on MeNB Release and addition of a bearer for a wrap around
in SeNB without impacting anything on MeNB, and without data loss Bearer modification with PDCP re-establishment for COUNT wrap around in SeNB Handling of the protocol stack during the of the SeNB or SeNB or MeNB bearer modification

BEARER RELEASE

FIELD OF THE INVENTION

The present invention relates to a user equipment method, user equipment, a base station method, a base station and computer program products.

BACKGROUND

Wireless telecommunication systems are known. In such systems, mobile communication devices known as user equipment (for example, mobile telephones) are operable to communicate with base stations provided by network providers.

In known wireless telecommunication systems, radio coverage is provided to network connectable devices, such as mobile telephones, or wireless devices such as iPads or other similar tablets, within areas known as cells. A base station is located in each cell to provide radio coverage. Typically, network connectable devices in each cell are operable to receive information and data from a base station and to transmit information and data to a base station.

User equipment roam through the wireless communications system. A number of base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

Traditional base stations provide coverage in relatively large geographical areas and those cells are often referred to as macro cells. It is possible to provide a heterogeneous network (HetNet) where smaller sized cells are provided within macro cells. Such smaller sized cells are sometimes referred to as micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity or user throughput within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator. In some cases, "dual connectivity" may be offered such that a user is configured to allow communication with two base stations such as, for example, a macro cell base station and a small cell base station. A number of dual connectivity implementations can be configured, each may offer different benefits.

With dual connectivity, user equipment is connected to both a macro cell provided by a master base station (MeNB) and a small cell provided by a secondary base station (SeNB). There are currently two architectural options being considered 1A and 3C. FIG. 1 illustrates the radio protocol stack for a bearer. FIG. 2 illustrates architectural option 1A, where a bearer is handled entirely in the small cell (i.e. all the radio access network (RAN) protocol layers for the bearer, packet data convergence protocol (PDCP), radio link control (RLC) and medium access control (MAC)) are in the SeNB. Security for the bearer is handled in the PDCP layer in the SeNB. FIG. 3 shows the encryption algorithm used for the bearer. The encryption algorithm uses a COUNT (or the packet number) as an input. The COUNT consists of two parts, the hyper frame number (HFN) and the sequence number (SN). The SN is included in each packet. The HFN is not included in order to reduce the packet size, but it is instead maintained within the user equipment and the network. This maintains synchronization of the COUNT in the network and the user equipment even if a number of packets less than the sequence number size is lost. Another input to the encryption algorithm is a 5 bit BEARER identity.

Although dual connectivity deployments may offer advantages, unexpected consequences of such deployments may occur. It is desired to address those consequences.

SUMMARY

According to a first aspect, there is provided a user equipment method, comprising: on reception of a trigger instructing modification of an access stratum radio bearer, preventing release of an associated non-access stratum bearer.

The first aspect recognizes that the same COUNT and BEARER value should not be used with the same key and, when a COUNT value wraps around, a new key or other updated security credential needs to be used for a bearer; in other words, the key needs to be refreshed. In addition, when this happens for a bearer in a SeNB, it is desirable to refresh the key for the bearer or the SeNB without impacting the MeNB bearers.

The first aspect also recognizes that existing approaches for providing a key refresh have drawbacks. One approach is to use an intra-cell handover, as illustrated in FIG. 5. During the intra-cell handover, a new key is generated. Accordingly, an intra-cell handover refreshes the key. However, the handover is associated with the primary cell (PCell) in the MeNB and existing arrangements do not establish the SeNB. So when an intra-cell handover occurs for user equipment configured in dual connectivity, the bearers in the SeNB will be released and moved to the MeNB. The SeNB will then need to be added again in a subsequent reconfiguration message. This movement of the bearer to the MeNB and back to the SeNB introduces an interruption to the bearer, leading to poor user experience, likely data loss and excessive signalling. Even if it was considered to introduce the SeNB cells as part of the intra-cell handover, that approach would be complex in terms of signalling coordination needed between the MeNB and SeNB. It will also cause unnecessary interruption to the MeNB bearers. Another approach may be to perform a reconfiguration of the bearer to use new keys. This is also complex because there will be packets in transit in the lower protocol layers that will be using the old keys. So there is no clear switchover point from the old the keys to the new keys. Also, introducing this would be complex and existing techniques do not use such mechanisms for a PCell change. Another approach would be to release an add the bearer, but that would result in a release of the bearer in the higher layers (EPS bearers) when using existing techniques, as illustrated in FIG. 4. Also, it results in data loss during the rekeying procedure.

Accordingly, a user equipment method is provided. The method may comprise the step of receiving a trigger. The trigger may instruct the modification of an access stratum radio bearer. The method may comprise, when the trigger is received, that the release of an associated or corresponding non-access stratum bearer may be prevented, omitted or may fail to occur. In this way, when an access stratum or data radio bearer is instructed to be released (as may occur when security credentials for that bearer need to be updated), the associated non-access stratum bearer may be retained in order to allow a update in security credentials to occur without disrupting communication as release of the non-access stratum bearer can result in dropping the user service such as a voice call, or losing data.

In one embodiment, the trigger provides an indication which indicates that release of the associated non-access stratum bearer is to be prevented. Accordingly, an indication may be provided by the trigger which indicates that the release of the non-access stratum bearer is to be prevented when the access stratum radio bearer is modified.

In one embodiment, the step of preventing comprises preventing transmission of an instruction instructing release of the associated non-access stratum bearer from an access stratum providing the access stratum radio bearer to a non-access stratum providing the associated non-access stratum bearer. Accordingly, an instruction or signal between the access stratum and the non-access stratum may be prevented from occurring.

In one embodiment, the method comprises, in response to the trigger, modifying the access stratum radio bearer with updated security characteristics. Accordingly, the access stratum radio bearer may be modified or released and re-established with updated security credentials in response to the trigger.

In one embodiment, the step of modifying the access stratum radio bearer causes data packets within at least some of the protocol layers associated with the access stratum radio bearer to be flushed. Accordingly, some or all data packets within some or all protocol layers of the access stratum radio bearer may be flushed during the modification or the release and the re-establishment of the access stratum radio bearer.

In one embodiment, the step of modifying comprises releasing and re-establishing the access stratum radio bearer by one of a re-establishment and a reset of access stratum protocol layers. Accordingly, some of the access stratum protocol layers may be re-established and some may be reset.

In one embodiment, the step of modifying comprises a re-establishment of a radio link control, a reset of a medium access control and of a physical protocol layer to flush data packets. Hence, the radio link control, medium access control and physical protocol layers may be flushed of data.

In one embodiment, the step of modifying comprises a re-establishment of a packet data convergence protocol layer with updated security characteristics. Accordingly, the packet data convergence protocol layer may be re-established with updated security credentials.

In one embodiment, the updated security characteristics comprise at least one of an updated identifier for the access stratum radio bearer and an indication of an updated key. Accordingly, the updated security credentials may be an updated identifier for the data radio bearer and/or an updated key or keys.

In one embodiment, the re-establishment of the packet data convergence protocol layer maintains packet data convergence protocol data packets and sequence numbers. Accordingly, during the re-establishment of the packet data convergence protocol layer, packet data convergence protocol data packets and their sequence numbers may be maintained.

In one embodiment, the method comprises, during the modification of the access stratum radio bearer, maintaining an identifier for the associated non-access stratum bearer. Accordingly, the identifier for the non-access stratum bearer may be maintained, kept or retained.

In one embodiment, the method comprises associating the identifier for the associated non-access stratum bearer with the access stratum radio bearer with updated security characteristics. Accordingly, the newly established access stratum radio bearer having the updated security credentials may be associated or linked with the non-access stratum bearer which was prevented from being released.

In one embodiment, the method comprises, in response to the trigger, providing an indication of a last sequential packet data convergence protocol data packets correctly received by the user equipment. Accordingly, an indication of the last correctly received data packet may be provided or transmitted by the user equipment to the network.

In one embodiment, the method comprises, in response to the trigger, providing an indication of packet data convergence protocol packet data units which failed to be received by the user equipment. Accordingly, an indication of those packets which failed to be received by the user equipment may be provided or transmitted by the user equipment to the network.

In one embodiment, the method comprises, in response to the trigger, releasing a plurality of access stratum radio bearers and preventing release of associated non-access stratum bearers. Accordingly, more than one access stratum radio bearer may be released and the associated non-access stratum bearers may be retained. In one embodiment, the plurality of bearers comprise all those associated bearers of the SeNB.

In one embodiment, the trigger comprises one of a message received from another network node and security update signal generated by the user equipment. Accordingly, the trigger may comprise a message or a security update signal. Typically, the message will be received from a MeNB for a dual connectivity arrangement, even though the message may have originated in a SeNB.

In one embodiment, the message indicates the updated security characteristics.

According to a second aspect, there is provided user equipment, comprising: logic operable, on reception of a trigger instructing modification of an access stratum radio bearer, to prevent release of an associated non-access stratum bearer.

In one embodiment, the trigger provides an indication which indicates that release of the associated non-access stratum bearer is to be prevented.

In one embodiment, the logic is operable to prevent transmission of an instruction instructing release of the associated non-access stratum bearer from an access stratum providing the access stratum radio bearer to a non-access stratum providing the associated non-access stratum bearer.

In one embodiment, the logic is operable, in response to the trigger, to modify the access stratum radio bearer with updated security characteristics.

In one embodiment, the logic is operable to cause data packets within at least some of the protocol layers associated with the access stratum radio bearer to be flushed.

In one embodiment, the logic is operable to modify by releasing and re-establishing the access stratum radio bearer by causing one of a re-establishment and a reset of access stratum protocol layers.

In one embodiment, the logic is operable to modify by causing a re-establishment of a radio link control, a reset of a medium access control and of a physical protocol layer to flush data packets.

In one embodiment, the logic is operable to modify by causing a re-establishment of a packet data convergence protocol layer with updated security characteristics.

In one embodiment, the updated security characteristics comprise at least one of an updated identifier for the access stratum radio bearer and an indication of an updated key. It will be appreciated that the indication may comprise an instruction to generate the updated key.

In one embodiment, the re-establishment of the packet data convergence protocol layer maintains packet data convergence protocol data packets and sequence numbers.

In one embodiment, the logic is operable to maintain an identifier for the associated non-access stratum bearer.

In one embodiment, the logic is operable to associate the identifier for the associated non-access stratum bearer with the access stratum radio bearer with updated security characteristics.

In one embodiment, the logic is operable, in response to the trigger, to provide an indication of a last sequential packet data convergence protocol data packets correctly received by the user equipment.

In one embodiment, the logic is operable, in response to the trigger, to provide an indication of packet data convergence protocol packet data units which failed to be received by the user equipment.

In one embodiment, the logic is operable, in response to the trigger, to release a plurality of access stratum radio bearers and to prevent release of associated non-access stratum bearers.

In one embodiment, the trigger comprises one of a message received from another network node and security update signal generated by the user equipment.

In one embodiment, the message indicates the updated security characteristics.

According to a third aspect, there is provided a base station method, comprising: on reception of a trigger instructing modification of an access stratum radio bearer, preventing release of an associated non-access stratum bearer. It will be appreciated that the trigger may be generated within the base station.

In one embodiment, the trigger provides an indication which indicates that release of the associated non-access stratum bearer is to be prevented.

In one embodiment, the step of preventing comprises preventing transmission of an instruction instructing release of the associated non-access stratum bearer from an access stratum providing the access stratum radio bearer to a non-access stratum providing the associated non-access stratum bearer. It will be appreciated that the instruction may be prevented from being transmitted to the core network.

In one embodiment, the method comprises, in response to the trigger, modifying the access stratum radio bearer with updated security characteristics.

In one embodiment, the step of modifying the access stratum radio bearer causes data packets within at least some of the protocol layers associated with the access stratum radio bearer to be flushed.

In one embodiment, the step of modifying comprises releasing and re-establishing the access stratum radio bearer by one of a re-establishment and a reset of access stratum protocol layers.

In one embodiment, the step of modifying comprises a re-establishment of a radio link control, a reset of a medium access control and of a physical protocol layer to flush data packets.

In one embodiment, the step of modifying comprises a re-establishment of a packet data convergence protocol layer with updated security characteristics.

In one embodiment, the updated security characteristics comprise at least one of an updated identifier for the access stratum radio bearer and an indication of an updated key.

In one embodiment, the re-establishment of the packet data convergence protocol layer maintains packet data convergence protocol data packets and sequence numbers.

In one embodiment, the method comprises, during the modifying of the access stratum radio bearer, maintaining an identifier for the associated non-access stratum bearer.

In one embodiment, the method comprises associating the identifier for the associated non-access stratum bearer with the access stratum radio bearer with updated security characteristics.

In one embodiment, the method comprises, in response to the trigger, releasing a plurality of access stratum radio bearers and preventing release of associated non-access stratum bearers. It will be appreciated that these bearers may comprise some or all of the SeNB bearers.

In one embodiment, the trigger comprises one of a message received from another network node and security update signal generated by the base station.

In one embodiment, the message indicates the updated security characteristics.

In one embodiment, the method comprises receiving an indication of a last sequential packet data convergence protocol data packets correctly received by user equipment and resuming transmission of from the last sequential packet data convergence protocol data packets correctly received by user equipment using the access stratum radio bearer with updated security characteristics.

In one embodiment, the method comprises receiving an indication of packet data convergence protocol packet data units which failed to be received by user equipment and retransmitting from the packet data convergence protocol packet data units which failed to be received by user equipment using the access stratum radio bearer with updated security characteristics.

According to a fourth aspect, there is provided a base station, comprising: logic operable, on reception of a trigger instructing modification of an access stratum radio bearer, to prevent release of an associated non-access stratum bearer.

In one embodiment, the trigger provides an indication which indicates that release of the associated non-access stratum bearer is to be prevented.

In one embodiment, the logic is operable to prevent transmission of an instruction instructing release of the associated non-access stratum bearer from an access stratum providing the access stratum radio bearer to a non-access stratum providing the associated non-access stratum bearer.

In one embodiment, the logic is operable, in response to the trigger, to modify the access stratum radio bearer with updated security characteristics.

In one embodiment, the logic is operable to cause data packets within at least some of the protocol layers associated with the access stratum radio bearer to be flushed.

In one embodiment, the logic is operable to modify by one of a re-establishment and a reset of access stratum protocol layers.

In one embodiment, the logic is operable to modify by a re-establishment of a radio link control, a reset of a medium access control and of a physical protocol layer to flush data packets.

In one embodiment, the logic is operable to modify by a re-establishment of a packet data convergence protocol layer with updated security characteristics.

In one embodiment, the updated security characteristics comprise at least one of an updated identifier for the access stratum radio bearer and an indication of an updated key.

In one embodiment, the re-establishment of the packet data convergence protocol layer maintains packet data convergence protocol data packets and sequence numbers.

In one embodiment, the logic is operable to maintain an identifier for the associated non-access stratum bearer.

In one embodiment, the logic is operable to associate the identifier for the associated non-access stratum bearer with the access stratum radio bearer with updated security characteristics.

In one embodiment, the logic is operable, in response to the trigger, to release a plurality of access stratum radio bearers and to prevent release of associated non-access stratum bearers. It will be appreciated that these bearers may comprise some or all of the SeNB bearers.

In one embodiment, the trigger comprises one of a message received from another network node and security update signal generated by the base station.

In one embodiment, the message indicates the updated security characteristics.

In one embodiment, the logic is operable to receive an indication of a last sequential packet data convergence protocol data packets correctly received by user equipment and to resume transmission of from the last sequential packet data convergence protocol data packets correctly received by user equipment using the access stratum radio bearer with updated security characteristics.

In one embodiment, the logic is operable to receive an indication of packet data convergence protocol packet data units which failed to be received by user equipment and to retransmit from the packet data convergence protocol packet data units which failed to be received by user equipment using the access stratum radio bearer with updated security characteristics.

According to a fifth aspect, there is provided a computer program product operable, when executed on a computer, to perform the method steps of the first or the third aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided. Embodiments provide an arrangement which allows a bearer security update, such as a key refresh or other change to the security configuration, to be performed within a base station without disrupting communication in that or another base station or causing the user equipment to lose data. This is achieved by performing a modified version of an add-and-release of the base station bearer. This would allow, for example, a key refresh in a master base station (MeNB) or in a secondary base station (SeNB) to be performed without disrupting communication in the MeNB or losing any user data.

Figure 1:
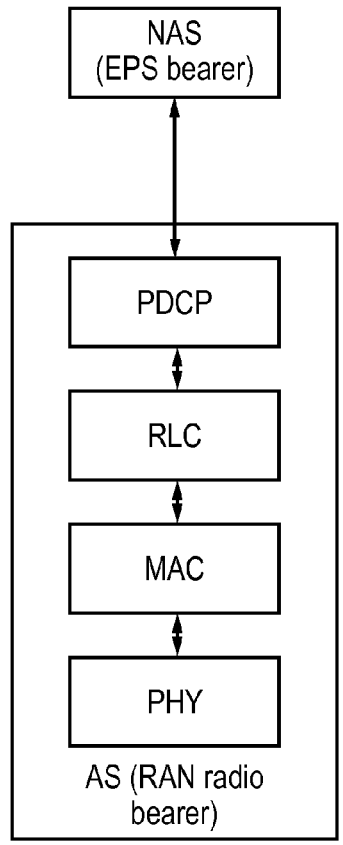
FIG. 1 illustrates the radio protocol stack for a bearer.
Figure 2:
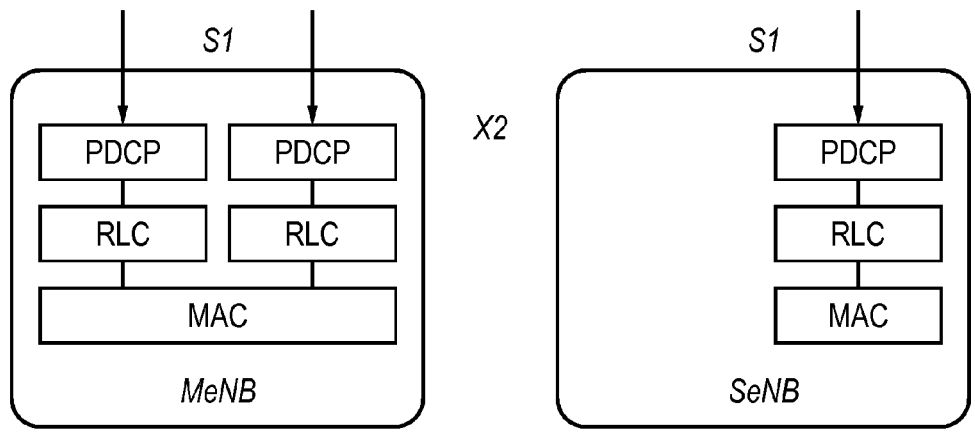
FIG. 2 illustrates architectural option 1A.
Figure 3:
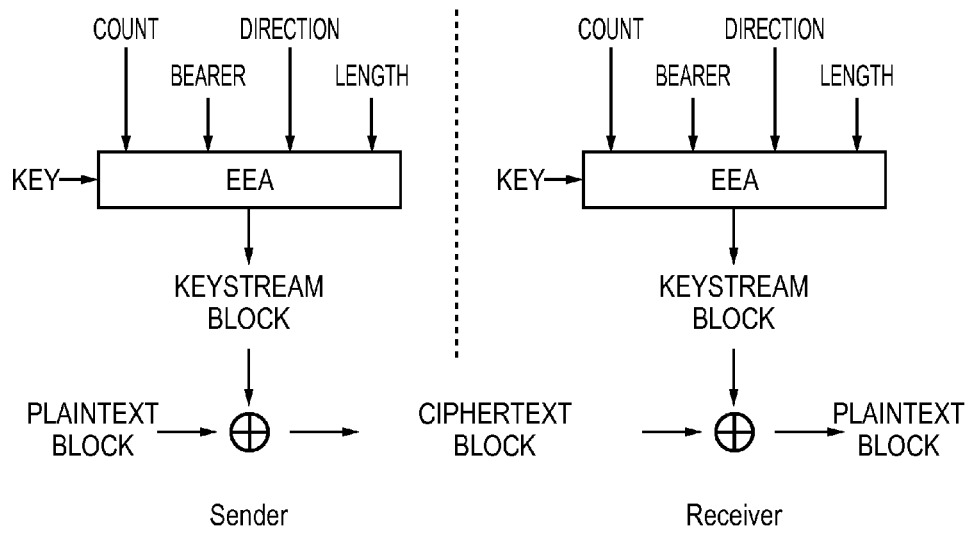
FIG. 3 shows the encryption algorithm used for the bearer.
Figure 4:
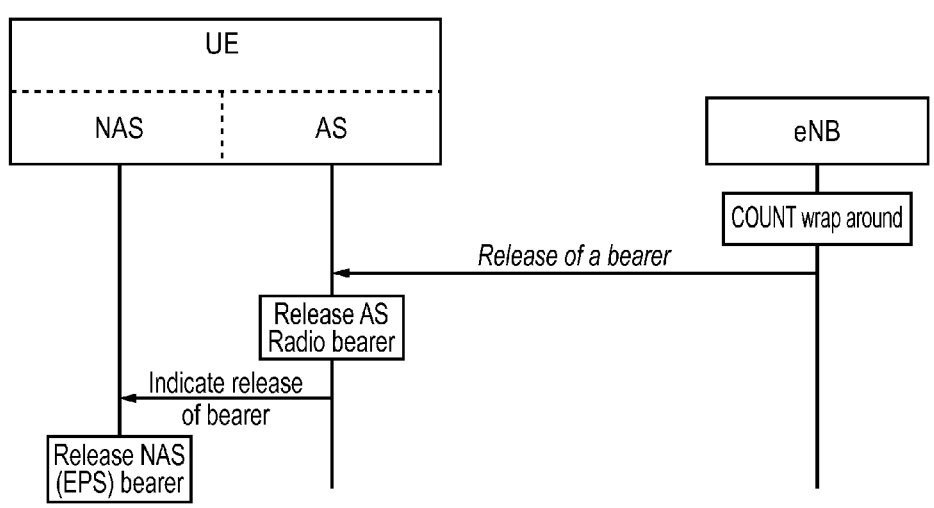
FIG. 4 shows an existing technique for releasing a radio bearer.
Figure 5:
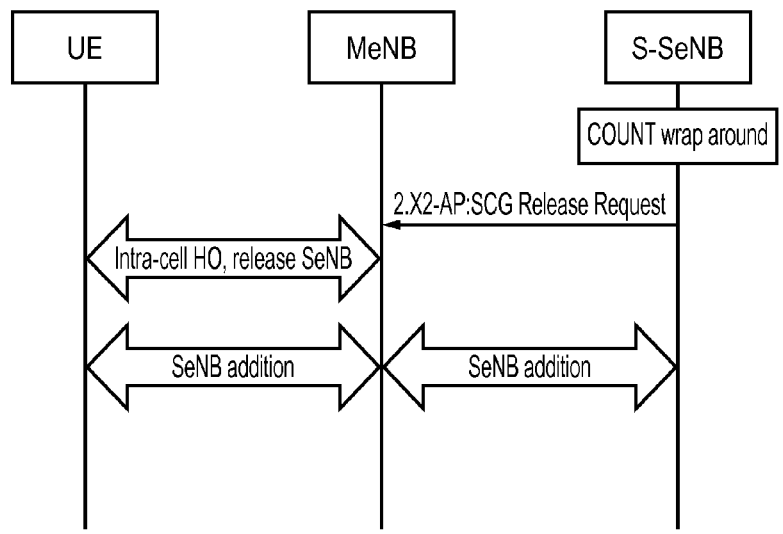
FIG. 5 illustrates an existing an intra-cell handover.
Figure 6:
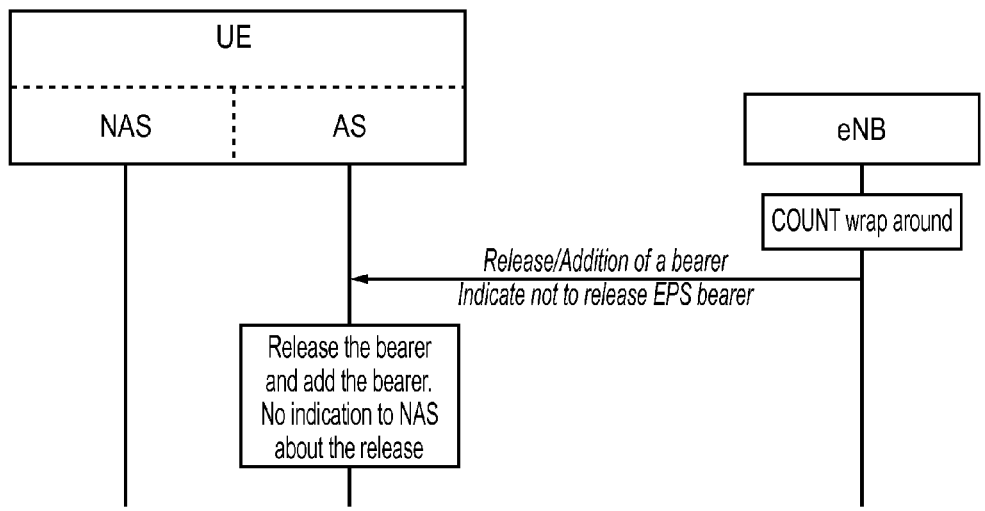
FIG. 6 illustrates a bearer being released and re-established with new security credentials without providing any indication to the upper layers.

As illustrated in FIG. 6, in one approach, the bearer is released and re-established with new security credentials (such as new keys) without providing any indication to the upper layers. In particular, the protocol layers of the access stratum bearer may be released and re-established, whilst the protocol layers of the non-access stratum bearer remain unaltered. This prevents the loss of the non-access stratum bearer to avoid impact on the upper layers. Although the rest of the access stratum bearer is released, the evolved packet system (EPS) bearer identifier in the access stratum is not released. This retained EPS bearer identity is used to link the newly added access stratum bearer with the existing bearer in the non-access stratum layer. In addition, the packet data convergence protocol (PDCP) sequence number of the last packet in a sequence which has been received correctly by the user equipment may be exchanged. For example, if a packet from a sequence is missing, then the sequence number of all correctly received packets in that sequence up to the missing packet or the sequence number of the packet that was not received in sequence is provided so that the missing packet can be re-transmitted. The PDCP data packets that were sent with sequence numbers greater than this packet sequence number are re-transmitted. Accordingly, no data packets are lost or out of sequence, even though some received data packets may be repeated.

Figure 9:
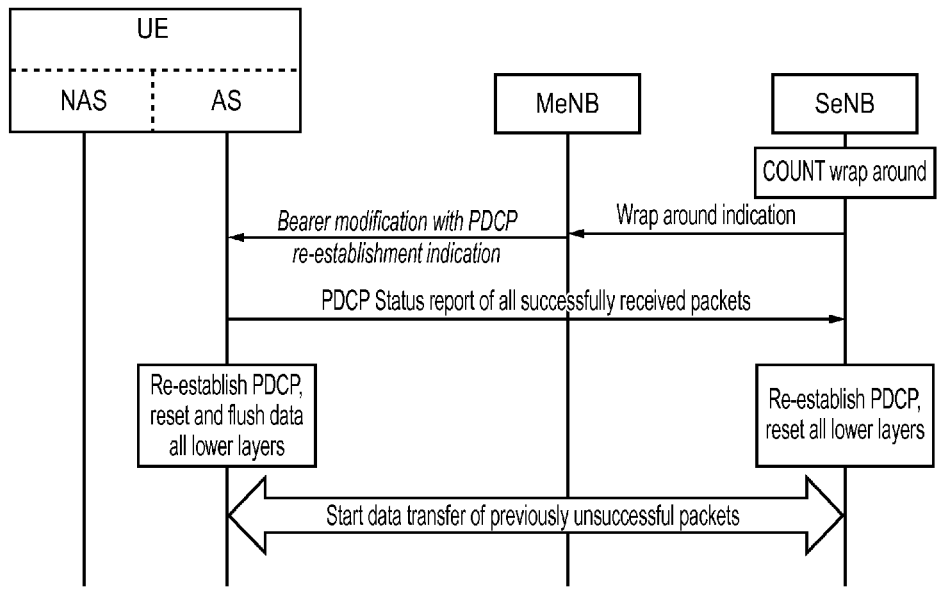
FIG. 9 illustrates the messaging used when maintaining the PDCP layer.
Figure 10:
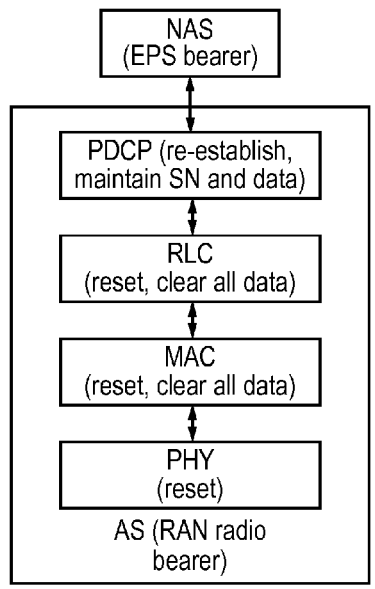
FIG. 10 illustrates the PDCP layer being maintained but re-established, whilst the lower layers are re-set.

As illustrated in FIGS. 9 and 10, in another arrangement, the PDCP layer of the access stratum associated with the bearer is maintained but re-established, whilst the lower radio link control (RLC) is re-established, medium access control (MAC) and physical protocol layers are re-set. Re-establishing the RLC and re-setting the MAC layers clears any packets in transit in those layers and thereby eliminates the complexity of handling data packets encrypted with different security credentials, such as different keys. Since the PDCP layer is maintained, but re-established, the lower layers of the PDCP layer are cleared whilst maintaining the PDCP data packets and the sequence numbers. Thus, the data packets are not lost using this approach.

Many different ways are envisaged to provide the new security credentials or association for the new bearer. For example, it is possible to use a new data radio bearer identifier (DRBID) for the newly created bearer. Likewise, it is possible to derive a new key autonomously in the network and user equipment during the process, based on some pre-specified rules. Also, a new key generation parameter may be signalled to the user equipment which is then used to derive the new key.

Bearer Change

Figure 7:
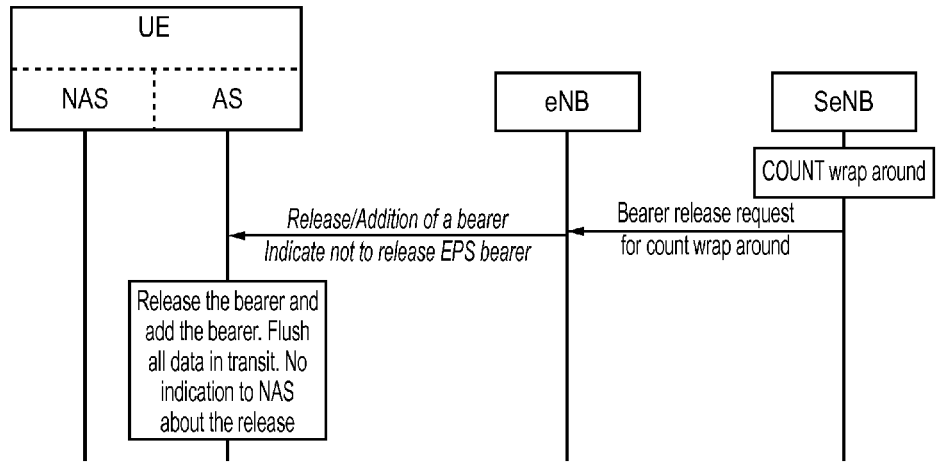
FIG. 7 illustrates a bearer being released and re-established with new security; credentials without providing any indication to the upper layers with dual connectivity.

As shown in FIG. 6, in one approach, when the COUNT for a bearer is about to wrap around, the network informs the user equipment to release and add the bearer along with an explicit indication to the user equipment that it should do so without informing the upper layers about the release of that bearer. When the bearer is then released, all the data in transit is flushed. New keys are used and then taken into account when the new bearer is established and the data packets are then encrypted using the new keys, As shown in FIG. 7, in one approach, the bearer wrap-around may relate to a bearer in the SeNB for architecture 1a. When this happens, the SeNB directly or indirectly, through the MeNB, informs the user equipment to release and re-establish the bearer without informing the NAS.

Figure 8:
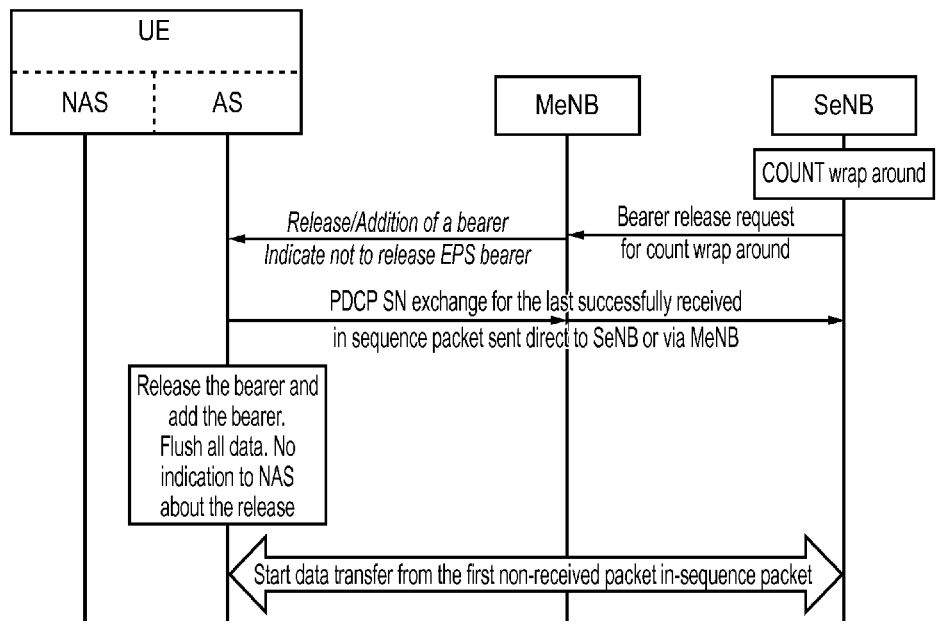
FIG. 8 illustrates the messaging used for the wrap-around in the SeNB.

As shown in FIG. 7, in one approach, the indication from the network may also request or trigger an exchange of the sequence number of the last successfully transferred PDCP data packet before the bearer is released. The protocol layers are released and re-set up in a similar manner to that described above, thereby releasing all of the user data. When the bearer is re-established, the new keys are taken into account. The transmitting entity then starts to send data from the first unsuccessfully transferred PDCP data packet to ensure that there is no data lost. This can result in repeating some PDCP data packets that were previously received out of sequence. This approach can also be used when the COUNT for the bearer in the MeNB or the SeNB wraps around. FIG. 8 illustrates the messaging used for the wrap-around in the SeNB.

In one approach, only the lower layers of the access stratum are re-set. In particular, the RLC is re-established and MAC are re-set and only data in transit in these layers is flushed. The PDCP layer is re-established with the security credentials, such as new keys. All received data packets, along with their COUNT, are retained. A PDCP status report is sent to inform the transmitting node about the successfully received data packets at the user equipment. This may be sent just before the PDCP re-establishment or just after. The transmitting node then sends all the packets that were not successfully received. This is the most optimal approach as there is no data loss or repetition of packets. FIG. 9 illustrates the messaging used when maintaining the PDCP layer.

It will be appreciated that any of the approaches mentioned above can be used for all the bearers in the MeNB or the SeNB together when one of the bearers in the MeNB or the SeNB wraps around.

Also, it will be appreciated that the key refresh may be triggered by reasons other than a count wrap-around. This could be, for example, a new key indication from the core network, any internal reason within a base station, and the like.

Also, it will be appreciated that the request from the SeNB could be an indication to the MeNB to request the user equipment to do so, or it could be a request from the SeNB relayed to the user equipment either through the MeNB or sent directly to the user equipment by the SeNB.

Accordingly, techniques provide an optimized method to perform, for example, a key refresh for security when the COUNT wraps around. It provides a mechanism to do the key refresh without disrupting the other bearers. It is also applicable and also more relevant for user equipment in dual connectivity because it is not disruptive to the bearers in the other base station, unlike existing techniques.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage.

Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A user equipment method, comprising:
   on reception of a trigger instructing modification of an access stratum radio bearer, retaining an associated non-access stratum bearer; and
   in response to said trigger, modifying said access stratum radio bearer to have updated security credentials wherein said modifying comprises a re-establishment of a packet data convergence protocol layer with updated security credentials and wherein said re-establishment of said packet data convergence protocol layer maintains packet data convergence protocol data packets and sequence numbers.

2. The method of claim 1, wherein said trigger provides an indication which indicates that release of said associated non-access stratum bearer is to be prevented.

3. The method of claim 1, wherein said retaining comprises preventing transmission of an instruction instructing release of said associated non-access stratum bearer from an access stratum providing said access stratum radio bearer to a non-access stratum providing said associated non-access stratum bearer.

4. The method of claim 1, wherein said modifying comprises releasing and re-establishing said access stratum radio bearer by one of a re-establishment and a reset of access stratum protocol layers.

5. The method of claim 1, wherein the modifying comprises a re-establishment of a radio link control, a reset of a medium access control and of a physical protocol layer to flush data packets.

6. The method of claim 1, comprising, during said modifying of said access stratum radio bearer, maintaining an identifier for said associated non-access stratum bearer.

7. The method of claim 6, comprising associating said identifier for said associated non-access stratum bearer with said access stratum radio bearer with updated security credentials.

8. The method of claim 1, comprising, in response to said trigger, providing at least one of an indication of a last sequential packet data convergence protocol data packets correctly received by said user equipment and an indication of packet data convergence protocol packet data units which failed to be received by said user equipment.

9. A computer program product operable, when executed on a computer, to perform the method of claim 1.

10. User equipment, comprising:
    logic operable, on reception of a trigger instructing modification of an access stratum radio bearer, to retain an associated non-access stratum bearer and, in response to the trigger, to modify the access stratum radio bearer to have updated security credentials, wherein the logic is operable to modify by causing a re-establishment of a packet data convergence protocol layer with updated security credentials and wherein said re-establishment of said packet data convergence protocol layer maintains packet data convergence protocol data packets and sequence numbers.

11. A base station method, comprising:
    on reception of a trigger instructing modification of an access stratum radio bearer, retaining an associated non-access stratum bearer; and
    in response to the trigger, modifying the access stratum radio bearer to have updated security credentials wherein the modifying comprises a re-establishment of a packet data convergence protocol layer with updated security credentials and wherein the re-establishment of the packet data convergence protocol layer maintains packet data convergence protocol data packets and sequence numbers.

12. A computer program product operable, when executed on a computer, to perform the method of claim 11.

13. A base station, comprising:
    logic operable, on reception of a trigger instructing modification of an access stratum radio bearer, to retain an associated non-access stratum bearer and in response to the trigger, to modify the access stratum radio bearer to have updated security credentials, wherein the logic is operable to modify by a re-establishment of a packet data convergence protocol layer with updated security credentials and wherein the re-establishment of the packet data convergence protocol layer maintains packet data convergence protocol data packets and sequence numbers.

* * * * *